United States Patent [19]

Bakowski

[11] Patent Number: 5,711,740
[45] Date of Patent: Jan. 27, 1998

[54] MECHANICAL CLUTCH FOR PLANETARY-TYPE GEAR REDUCTION UNIT

[75] Inventor: Richard A. Bakowski, Warners, N.Y.

[73] Assignee: New Venture Gear, Inc., Troy, Mich.

[21] Appl. No.: 655,119

[22] Filed: May 29, 1996

[51] Int. Cl.$^6$ ................................ F16H 3/78; F16H 37/06
[52] U.S. Cl. ........................... 475/303; 475/295; 475/332; 180/247
[58] Field of Search ..................................... 475/198, 204, 475/295, 303, 332; 180/247, 248, 249, 250

[56] References Cited

U.S. PATENT DOCUMENTS

| | | | |
|---|---|---|---|
| 4,182,202 | 1/1980 | Grey | 475/303 |
| 4,489,626 | 12/1984 | Lemon | 475/303 |
| 4,549,449 | 10/1985 | Miller et al. | 475/303 |
| 4,770,280 | 9/1988 | Frost | 192/53 F |
| 4,838,121 | 6/1989 | Takeshita et al. | 475/303 |
| 5,346,442 | 9/1994 | Eastman | 475/223 |

*Primary Examiner*—Charles A. Marmor
*Assistant Examiner*—Sherry Lynn Estremsky
*Attorney, Agent, or Firm*—Harness, Dickey & Pierce, P.L.C.

[57] ABSTRACT

The present invention is directed to a two-speed gear reduction unit and a shift mechanism for establishing two distinct speed ratio drive connections between an input member and an output member. More specifically, the shift mechanism includes a clutch apparatus for stopping relative rotation between the input and output members prior to shifting the gear reduction unit from its neutral operating state into either of its high-range or low-range operating states. Thus, the present invention is adapted for use in the transfer case of a four-wheel drive vehicle for shifting between four-wheel high-range and low-range drive modes.

11 Claims, 5 Drawing Sheets

MECHANICAL CLUTCH FOR PLANETARY-TYPE GEAR REDUCTION UNIT

BACKGROUND OF THE INVENTION

1. Field of the Invention

The present invention relates generally to a planetary gear assembly and, more specifically, to a planetary gear assembly having a mechanical clutch for stopping relative rotation between its input and output members.

2. Description of Background Art

Modernly, many light-duty and sport-utility vehicles are equipped with a power transfer unit, such as a transfer case, for providing a four-wheel drive mode of operation. To accommodate differing road surfaces and conditions, many transfer cases are also equipped with a gear reduction unit that can be selectively shifted by the vehicle operator for providing a high-range (i.e., direct drive) and a low-range (i.e., reduced ratio drive) in conjunction with the four-wheel drive mode. Reference may be had to commonly-owned U.S. Pat. No. 4,770,280 for disclosure of an exemplary transfer case equipped with a planetary-type gear reduction unit. In operation, such transfer cases can only be shifted between the four-wheel low-range drive mode and the four-wheel high-range drive mode when the motor vehicle is in a substantially non-motive condition. As an alternative, commonly-owned U.S. Pat. No. 5,346,442 discloses a synchronized range shift mechanism for use with a planetary-type gear reduction unit which permits the transfer case to be shifted "on-the-fly" from its four-wheel low-range drive mode into its four-wheel high-range drive mode.

In four-wheel vehicles where such on-the-fly range shifting of the transfer case is not required, a problem still exists when the vehicle is equipped with an automatic transmissions. In particular, when the motor vehicle is stopped in order to shift between the four-wheel high-range and low-range drive modes, the automatic transmission may continue to drive the transmission output shaft and the transfer case input shaft due to residual drag torque transferred thereto by the torque converter. Therefore, despite the vehicle being stopped, rotation of the transfer case input shaft may prevent the range clutch from smoothly engaging the desired drive component of the gear reduction unit. Accordingly, it is desirable in transfer cases associated with four-wheel drive vehicles equipped with automatic transmissions to provide an apparatus for eliminating such rotation of the input shaft so as to allow smooth engagement of the range clutch with the desired drive component of the planetary-type gear reduction unit.

SUMMARY OF THE INVENTION

Accordingly, it is an object of the present invention to provide a clutch apparatus that can be actuated for stopping relative rotation between the input and output members of a two-speed gear reduction unit. Such braking is accomplished through utilization of a clutch pack that can be actuated to ground the input member to the output member. In operation, the clutch pack is actuated in response to movement of a range sleeve out of its Neutral position towards either of its Hi or Lo Range positions.

It is a further object of the present invention to provide a mechanically-actuated clutch apparatus for use with a planetary-type gear reduction unit which is simple in structure, inexpensive to manufacture, easy to mass produce and durable in use.

These and other objects of the present invention are obtained by providing a mechanically-actuated clutch assembly for a two-speed gear reduction unit comprised of an input member, a planetary gear assembly driven by the input member at a reduced speed ratio relative thereto, and an output member. The output member is adapted to be drivingly connected with either the input member or the planetary gear assembly in order to respectively establish one of a high-range drive mode and a low-range drive mode. An intermediate sleeve is supported on the output member for rotation therewith and limited sliding movement thereon. Likewise, a range sleeve is slidably disposed on the intermediate sleeve for rotation therewith. A spring-biased detent assembly releasably couples the range sleeve to the intermediate sleeve for inhibiting relative sliding movement therebetween until the clutch apparatus is actuated and the spring biasing is overcome. The clutch apparatus includes a plurality of clutch plates attached to the intermediate sleeve that are intermeshed with a plurality of clutch plates attached to the input member. The clutch apparatus is actuated by movement of the range sleeve out of its Neutral position, whereby the spring biasing of the detent assembly causes concurrent sliding movement of the intermediate sleeve for frictionally engaging the interleaved clutch plates and stopping rotation of the input member relative to the output member. As the spring biasing of the detent assembly is overcome, the range sleeve is released for movement relative to the intermediate sleeve into either of its Hi-Range or Lo-Range positions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

In general, the present invention is directed to a two-speed planetary-type gear reduction unit and a shift mechanism for establishing two distinct speed ratio drive connections between an input member and an output member. More specifically, the shift mechanism includes a clutch apparatus for stopping relative rotation between the input and output members prior to shifting the gear reduction unit from its neutral operating state into either of its high-range or low-range operating states. Thus, the present invention is well-suited for use in the transfer case of a four-wheel drive vehicle for shifting between four-wheel high-range and low-range drive modes.

Figure 1:
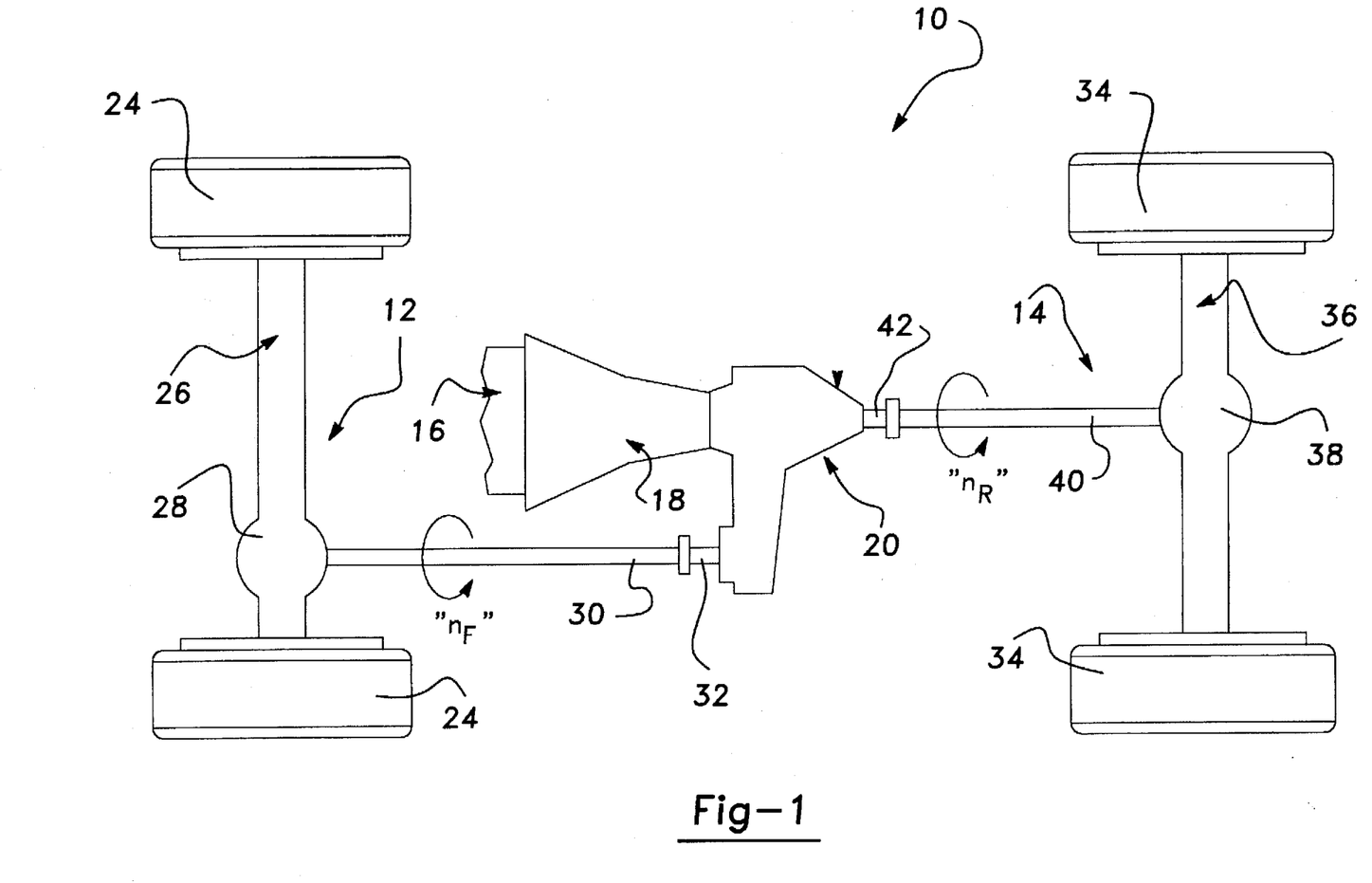
FIG. 1 is a schematic illustration of a four-wheel drive vehicle equipped with a transfer case embodying the present invention.

Referring specifically to FIG. 1, a drivetrain 10 for use in a four-wheel drive vehicle is schematically shown to include a front driveline 12 and a rear driveline 14 selectably drivable from a source of power, such as an engine 16, through a transmission 18. Drivetrain 10 further includes a transfer case 20 arranged to transmit drive torque from transmission 18 to front driveline 12 and rear driveline 14. Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of rear prop shaft 40, the opposite end of which is interconnected to a rear output shaft 42 of transfer case 20.

Figure 2:
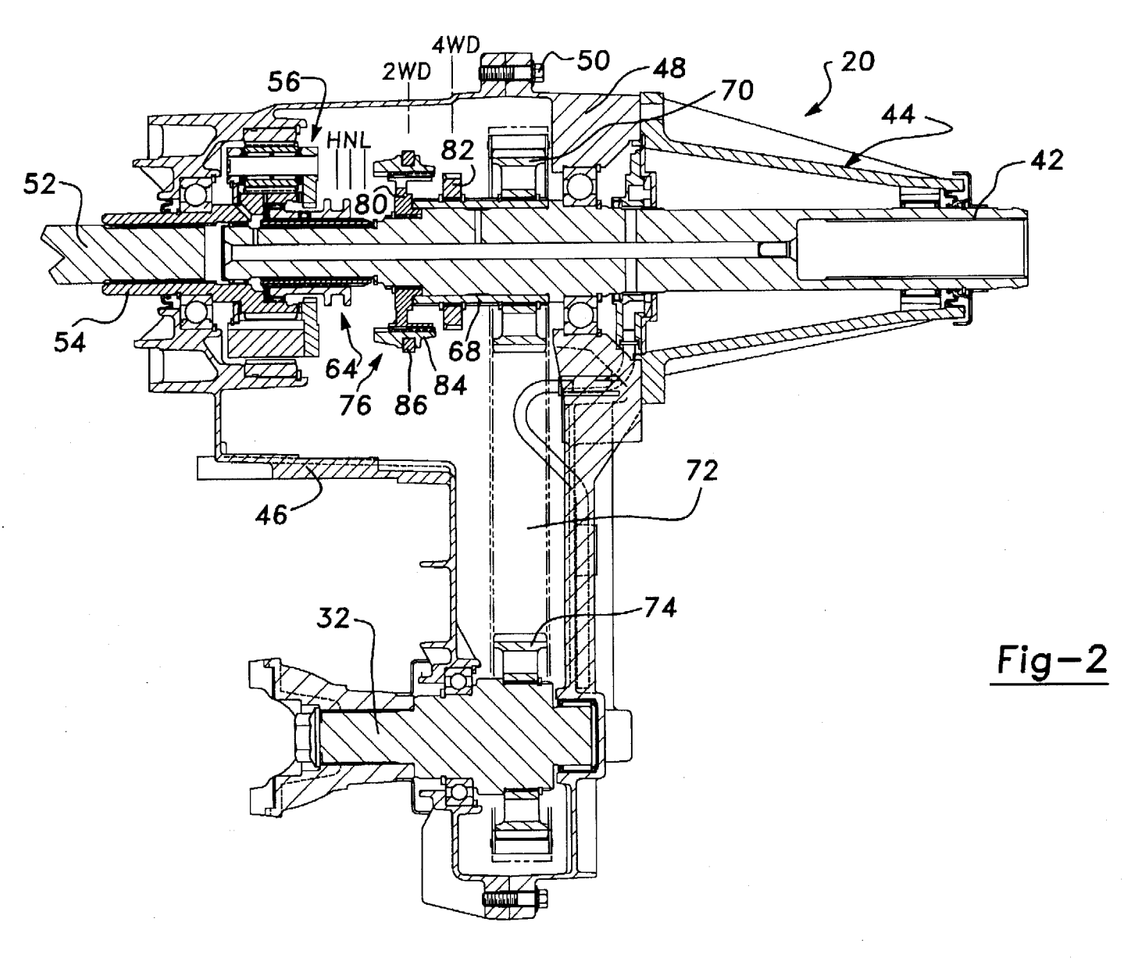
FIG. 2 is a sectional view of the transfer case which is equipped with a planetary-type gear reduction unit and a range shift mechanism having a mechanically-actuated clutch apparatus that is operable for stopping relative rotation between the input shaft and the rear output shaft.

With particular reference to FIG. 2, transfer case 20 is shown to include a housing assembly 44 including front and rear housing sections 46 and 48, respectively, which are suitably interconnected by a plurality of threaded bolts 50. Front housing section 46 receives a transmission output shaft 52 that is coupled (i.e., splined) to a transfer case input shaft 54 such that shafts 52 and 54 are rotatably driven by engine 16 at the gear ratio established by transmission 18. Transfer case 20 is further shown to include a planetary-type gear reduction unit 56 that is operably installed between input shaft 54 and rear output shaft 42. In general, input shaft 54 acts as an input member for rotatably driving a planetary gear assembly 62 of gear reduction unit 56 at a predetermined speed ratio relative thereto. In addition, rear output shaft 42 acts as the output member of gear reduction unit 56 and can be selectively coupled to either of input shaft 54 or planetary gear assembly 62 for driven rotation therewith.

Transfer case 20 also includes a range shift mechanism 64 that is operable in conjunction with gear reduction unit 56 for establishing: a "high-range" drive mode in which rear output shaft 42 is rotatably driven at a direct speed ratio relative to input shaft 54; a "low-range" drive mode in which rear output shaft 42 is rotatably driven at a reduced speed ratio relative to input shaft 54; and a "neutral" non-driven mode in which the driven connection between input shaft 54 and rear output shaft 42 is interrupted. Since many components of transfer case 20 and planetary gear assembly 62 are generally similar to those shown and described in commonly-owned U.S. Pat. No. 5,076,112 to Williams, the entire disclosure thereof is expressly incorporated by reference herein. However, as will be detailed hereinafter in greater detail, the present invention is directed to the integration of a clutch apparatus 66 between input shaft 54 and rear output shaft 42 that is operable for preventing undesirable tooth clash and/or shift block-out during such range shifting due to rotation of input shaft 54 caused by the residual drag torque transmitted thereto by transmission 18.

In the particular embodiment shown, rear output shaft 42 is rotatably supported in housing assembly 44 and aligned on the longitudinal axis of input shaft 54. A chain carrier 68 is shown rotatably supported on rear output shaft 42 and includes a drive sprocket 70 drivingly engaging a chain, shown in dashed lines at 72, and which is coupled to a driven sprocket 74. Driven sprocket 74 is, in turn, coupled to front output shaft 32. Since transfer case 20 is shown as a "part-time" power transfer device, a mode shift mechanism 76 is provided for permitting the vehicle operator to selectively shift between a two-wheel drive mode and a four-wheel drive mode. Mode shift mechanism 76 includes a hub member 80 that is fixed (i.e., splined) for rotation on rear output shaft 42, a clutch plate 82 fixed (i.e., splined) for rotation on chain carrier 68, and a mode sleeve 84 splined to hub 80 for rotation therewith and axial sliding movement thereon. Mode sleeve 84 is movable on hub 80 between the (2WD) position shown whereat it is uncoupled from clutch plate 82 and a (4WD) position whereat it is coupled to clutch plate 82. A mode fork, partially shown at reference numeral 86, operably connects mode sleeve 84 to a shift actuator (not shown). To shift transfer case 20 from its two-wheel drive mode into its four-wheel drive mode, the vehicle operator actuates the shift actuator for causing axial movement of mode sleeve 84 from its (2WD) position toward its (4WD) position. In its (4WD) position, mode sleeve 84 effectively couples front output shaft 32 to rear output shaft 42, thereby establishing the four-wheel drive mode. As will be appreciated, subsequent movement of mode sleeve 84 from its (4WD) position to its (2WD) position acts to reverse the "mode" shifting sequence for shifting transfer case 20 into its two-wheel drive mode in which drive torque is only transmitted to rear output shaft 42. Typically, transfer case 20 is maintained in its high-range drive mode (i.e., maintaining a direct-drive connection between input shaft 54 and rear output shaft 42) during such "mode" shifting.

While not shown, it is contemplated that mode shift mechanism 76 could easily include a synchronizer assembly between hub 80 and clutch plate 82 for permitting transfer case 20 to be shifted "on-the-fly" between its two and four-wheel drive modes. As is known, energization of such a synchronizer assembly is caused by axial movement of mode sleeve 84 toward its (4WD) position which, in turn, causes speed synchronization between rear output shaft 42 and chain carrier 68. Mode sleeve 84 can thereafter be moved completely into its (4WD) position. In its (4WD) position, mode sleeve 84 effectively couples front output shaft 32 to rear output shaft 42, thereby establishing the four-wheel drive mode.

Figure 3:
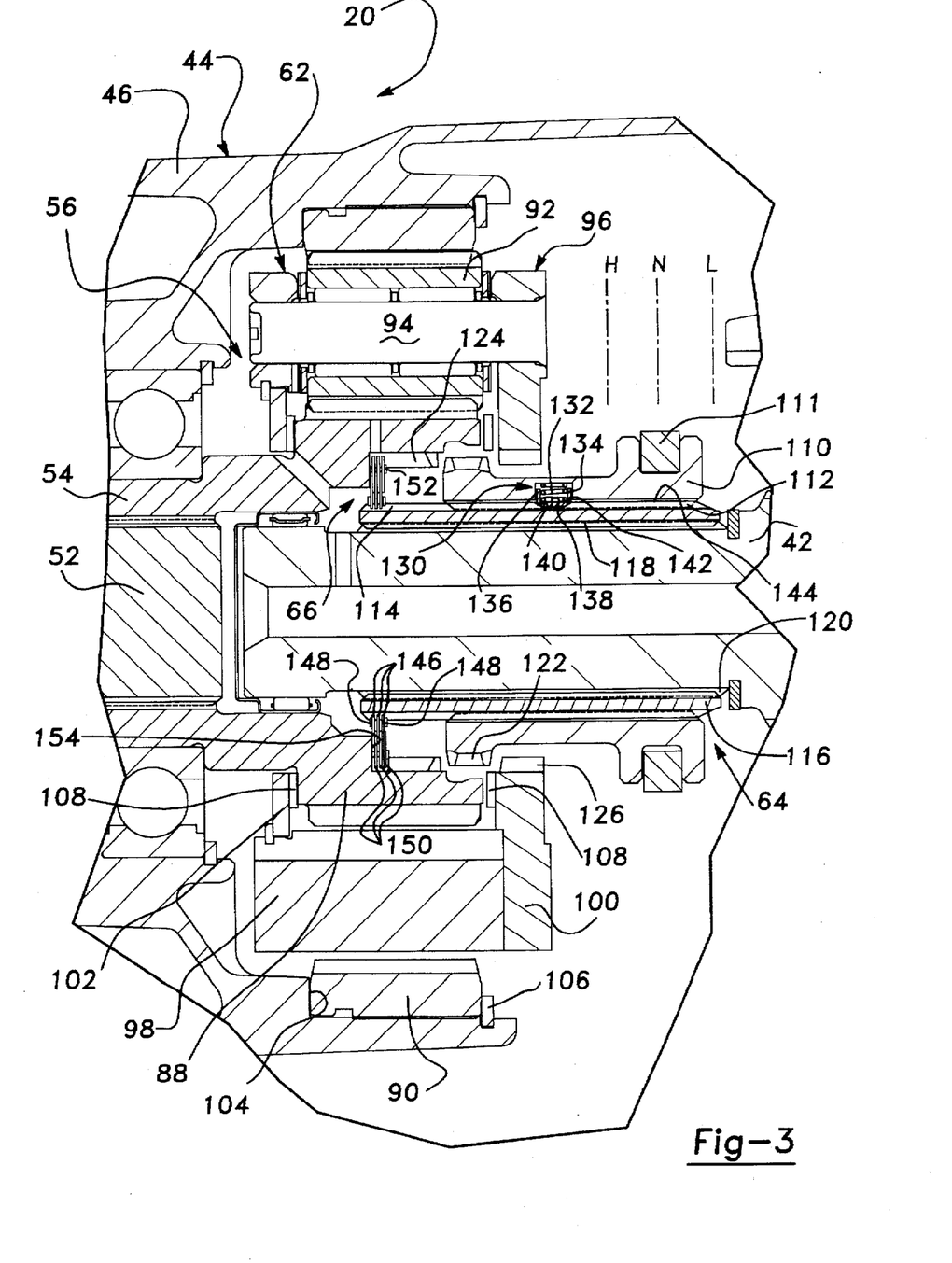
FIG. 3 is an enlarged partial view of FIG. 2 showing the range sleeve in its Neutral position.
Figure 4:
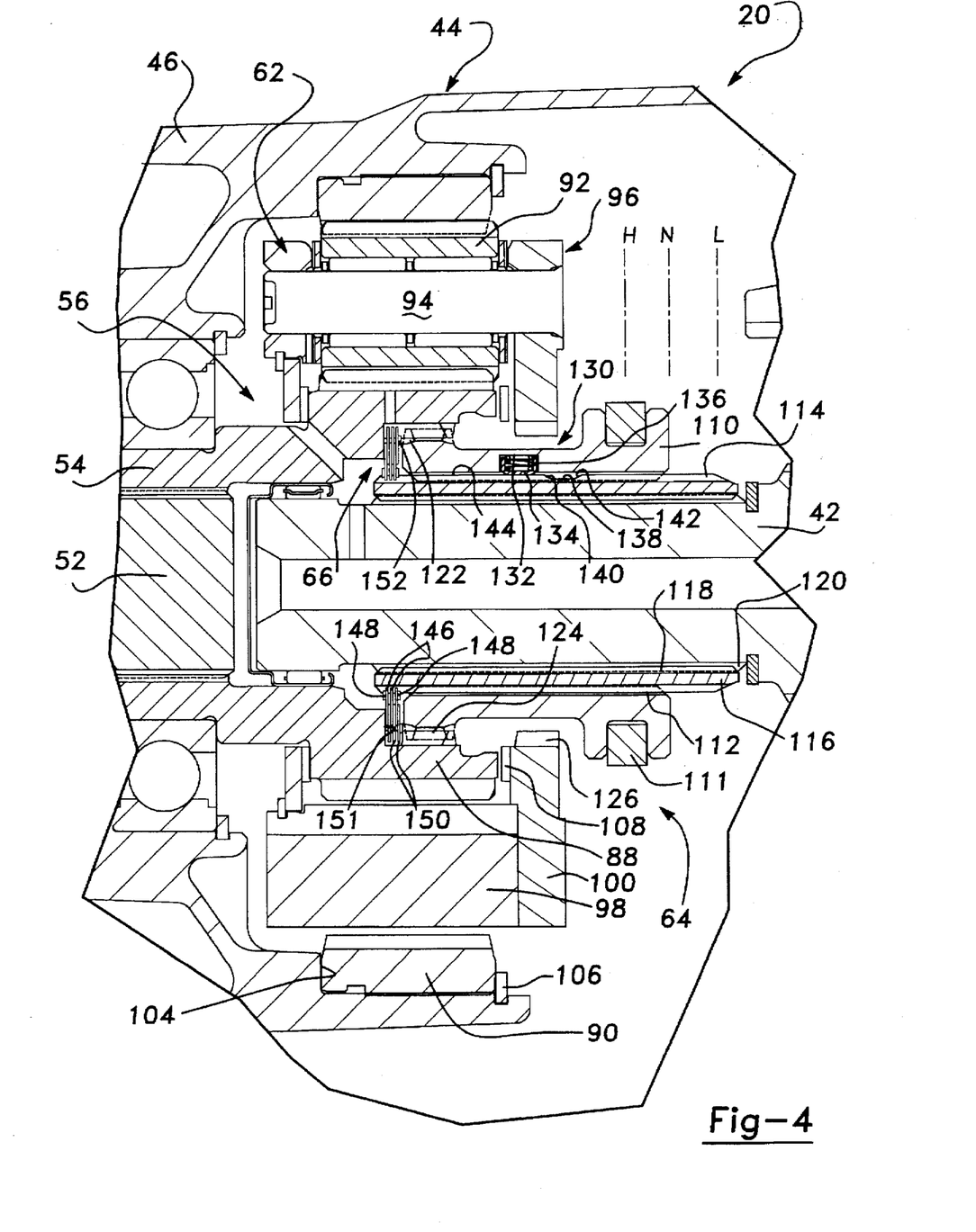
FIG. 4 is a view, similar to FIG. 3, showing the range sleeve in its Hi-Range position.
Figure 5:
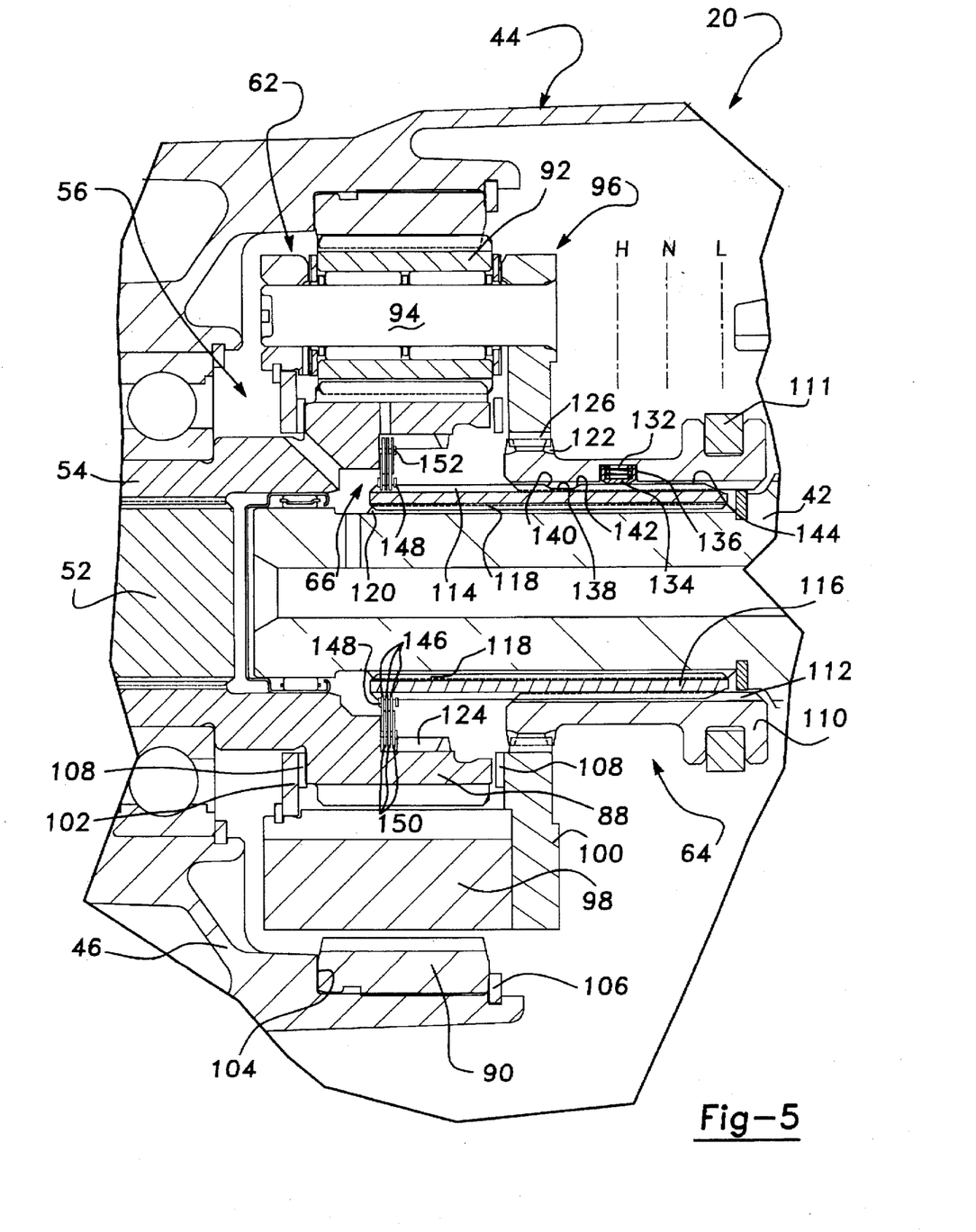
FIG. 5 is a view, also similar to FIG. 3, showing the range sleeve in its Lo-Range position.

As best seen in FIGS. 3 through 5, gear reduction unit 56 is shown to include a sun gear 88 integrally formed on input shaft 54, a ring gear 90 fixed to housing section 46, and planetary gear assembly 62 which has a plurality of planet gears 92 supported from a planet carrier 96 that are meshed with sun gear 88 and ring gear 90. Each planet gear 92 is rotatably supported on a pinion shaft 94 having its opposite ends retained in planet carrier 96. Preferably, planet carrier 96 is constructed to include front and rear annular carrier rings 98 and 100, respectively, that are secured together by suitable fasteners (not shown). A locking disc 102 is secured to front carrier ring 98 for rotation therewith. Ring gear 90 is additionally retained against rearward axial movement away from a stop shoulder 104 by a snap ring 106. If desired, sun gear 88 could be a separate component that is suitably secured to input shaft 54. While not critical to the present invention, it is preferable that the gears of gear reduction unit 56 be of the helical type. That is, sun gear 88, ring gear 90, and planet gears 92 all are formed to have helical gear teeth. To contain the axial thrust loads generated due to the helical gear teeth, and facilitate relative rotation between sun gear 88 and planet carrier 96, thrust washers 108 are located between the laterally-spaced radial edge surfaces of sun gear 88 and the inner surfaces of carrier ring 98 and locking disc 102. In this manner, planet carrier 96 is axially restrained by sun gear 88 while being free to float radially for negating or substantially minimizing unbalanced torque loading thereon.

Range shift mechanism 64 is shown to include a range sleeve 110 which is engageable by a range fork, partially shown at reference numeral 111, that is operably connected to the shift actuator. Range sleeve 110 is movable between a Hi-Range position (position line "H"), a Neutral position (position line "N"), and a Lo-Range position (position line "L") for establishing the corresponding drive modes across gear reduction unit 56. Range sleeve 110 is shown to include internal splines 112 that are meshed with external splines 114 of an intermediate sleeve 116. Additionally, internal splines 118 on intermediate sleeve 116 are meshed with external splines 120 on rear output shaft 42. Thus, range sleeve 110 and intermediate sleeve 116 are coupled for common rotation with rear output shaft 42 and yet can slide axially relative thereto and with respect to one another. Range sleeve 110 also includes external clutch teeth 122 that are selectively engageable with internal clutch teeth 124 formed on input shaft 54 when range sleeve 110 is located in its Hi-Range position, whereby a direct connection is established between input shaft 54 and rear output shaft 42 for establishing the high-range drive mode. Likewise, clutch teeth 122 are selectably engageable with internal clutch teeth 126 on rear carrier ring 100 when range sleeve 110 is in its Lo-Range position, whereby the reduced ratio drive connection between input shaft 54 and rear output shaft 42 across planetary gear assembly 62 is established for defining the low-range drive mode. Finally, the neutral mode is established when range sleeve 110 is in its Neutral position whereat clutch teeth 122 are uncoupled from input shaft clutch teeth 124 and carrier assembly clutch teeth 126.

The shift actuator is adapted to move range sleeve 110 in coordination with movement of mode sleeve 84 for establishing various drive modes, namely, a two-wheel high-range drive mode, a four-wheel high-range drive mode, a neutral mode and a four-wheel low-range drive mode. While any suitable shift actuator is contemplated for use with transfer case 20, above-noted U.S. Pat. No. 5,076,112 discloses a preferred type of system having a sector plate that is rotatable under the control of an input from the vehicle operator (i.e., via manual actuation of a shift lever or remote actuation of a power-operated actuator) for coordinating movement of mode sleeve 84 and range sleeve 110.

In accordance with the present invention, clutch apparatus 66 is operable for stopping rotation of input shaft 54 relative to rear output shaft 42 when gear reduction unit 56 is shifted into either of its high-range or low-range drive modes. Moreover, axial sliding movement of range sleeve 110 is operable for actuating clutch apparatus 66 for braking such relative rotation. To this end, means are provided for releasably coupling range sleeve 110 to intermediate sleeve 116 and for generating an axially-directed clutch engagement force. In particular, range shift mechanism 64 also includes a thrust mechanism, such as a spring-biased detent assembly 130 comprised of one or more biasing springs 132 and poppets 134 retained in poppet chambers 136 formed in range sleeve 110. When range sleeve 110 is in its Neutral position, as shown in FIG. 3, poppet 134 is biased by spring 132 into a detent recess 138 formed in intermediate sleeve 116. Thus, as range sleeve 110 is initially shifted from its Neutral position toward either of its Hi-Range or Lo-Range positions, detent assembly 130 transmits an axial force to intermediate sleeve 116 which, in turn, causes limited axial movement thereof relative to rear output shaft 42. This axial sliding movement of intermediate sleeve 116 actuates clutch apparatus 66 for stopping relative rotation between input shaft 54 and rear output shaft 42. Such action is desireable for braking (i.e., stopping) rotation of input shaft 54 caused by residual transmission drag torque. When the shift force applied to range sleeve 110 is sufficient to overcome the biasing force of spring 132, poppet 134 compresses spring 132 and rides up one of front and rear sloped surfaces 140 and 142, respectively, of detent recess 138 until poppet 134 engages an upper planar surface 144 of intermediate sleeve 116. With poppet 134 released from detent recess 138, range sleeve 110 is free to slide axially relative to intermediate sleeve 116 toward its engaged position with either of input shaft 54 or planetary gear assembly 62. By this time, however, actuation of clutch apparatus 66 via axial movement of intermediate sleeve 116 has already brought rotation of input shaft 54 to the same speed as rear output shaft 42, which is generally stationary if the vehicle is not moving. If the vehicle is moving at a slow rate of speed, clutch apparatus 66 will have a synchronous effect and cause input shaft 54 to rotate at the same speed as rear output shaft 42.

Clutch apparatus 66 is shown to be a multi-disc clutch assembly including a plurality of inner clutch plates 146 splined to external splines 114 of intermediate sleeve 116 and that are retained thereon by a pair of snap rings 148. In addition, clutch apparatus 66 includes a plurality of outer clutch plates 150 that are splined to clutch teeth 124 on input shaft 54 adjacent to shoulder 151 and retained thereon by a snap ring 152. Clutch plates 150 are alternately interleaved with clutch plates 146 to define a clutch pack that is retained by snap rings 148 and 152 adjacent to a radial shoulder surface 154 of sun gear 88.

The sequence of operational steps associated with "braking" of input shaft 54 during a neutral to high-range or a neutral to low-range shifting process will now be described in greater detail. Initial sliding movement of range sleeve 110 from its Neutral position (FIGS. 2 and 3) to either of its Hi-Range (FIG. 4) or Lo-Range (FIG. 5) positions, causes poppet 134 to press against a corresponding one of angled surfaces 140 and 142 formed on either side of detent recess 138. More particularly, upon forward sliding movement of range sleeve 110 toward its Hi-Range position, poppet 134 engages angled surface 140 and spring 132 is compressed, whereby an axial force is applied to intermediate sleeve 116 which causes forward axial sliding movement thereof. Such forward sliding movement of intermediate sleeve 116 actuates clutch apparatus 66 by causing a compressive clamping force to be exerted on the interleaved clutch plates which acts to brake rotation of input shaft 54 relative to rear output shaft 42. When the continuing shift force applied by range shift mechanism 64 to range sleeve 110 is sufficient to overcome the biasing force exerted by spring 132 against poppet 134, poppet 134 rides up angled surface 140 of detent recess 138 until it engages surface 144 for allowing free sliding movement of range sleeve 110 relative to intermediate sleeve 116. Subsequent forward sliding movement of range sleeve 110 causes external clutch teeth 122 to meshingly engage internal clutch teeth 124 on input shaft 54 for establishing the direct drive high-range connection therebetween. Concurrently, intermediate sleeve 116 is free to slide rearwardly to a position whereat the compressive force is removed from the interleaved clutch pack, thereby de-actuating clutch apparatus 66.

Rearward sliding movement of range sleeve 110 toward its Lo-Range position causes poppet 134 to bear against angled surface 142 of detent recess 138 for compressing spring 132 and exerting a rearwardly-directed axial force on intermediate sleeve 116. Such action causes rearward sliding movement of intermediate sleeve 116 for again applying a compressive clutch engagement force on the interleaved clutch plates for braking relative rotation of input shaft 54 relative to rear output shaft 42. Once braking is complete, the axial shift force applied to range sleeve 110 will permit poppet 134 to ride along tapered surface 142 of recess 138 until poppet 134 engages upper surface 144 at which point range sleeve 110 is permitted to slide to its Lo-Range position whereat its clutch teeth 122 are meshed with clutch teeth 126 on carrier assembly 96. Again, intermediate sleeve 116 is permitted to slide forwardly for removing the compressive force from the clutch pack, thereby de-actuating clutch apparatus 66.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear reduction unit comprising:

an input member;

an output member;

a planetary gear assembly driven by said input member at a reduced speed ratio relative thereto;

a range sleeve supported for rotation with said output member and movable thereon between a first position uncoupled from said input member, a second position coupled to said input member for driving said output member at a direct speed ratio relative to said input member, and a third position coupled to said planetary gear assembly for driving said output member at said reduced speed ratio; and a clutch apparatus operably installed between said input member and said output member, said clutch apparatus being actuated in response to movement of said range sleeve toward either of its second and third positions for stopping relative rotation between said input member and said output member prior to coupling of said range sleeve to either of said input member and said planetary gear assembly, said clutch apparatus including a first clutch plate fixed for rotation with said input member, a second clutch plate fixed for rotation with said output member, and a thrust mechanism for actuating said clutch apparatus by frictionally clamping said first and second clutch plates in response to movement of said range sleeve toward its second and third positions.

2. The gear reduction unit of claim 1 wherein said thrust mechanism includes an intermediate sleeve supported for rotation with and sliding movement on said output member, and wherein said range sleeve is supported for rotation with and sliding movement on said intermediate sleeve, said thrust mechanism further including a detent assembly for releasably coupling said intermediate sleeve for sliding movement with said range sleeve, said detent assembly operable for releasing said range sleeve for sliding movement relative to said intermediate sleeve following actuation of said clutch apparatus.

3. A gear reduction unit comprising:

an input member;

an output member;

a sun gear fixed to said input member;

a stationary ring gear;

a planet carrier rotatably supporting a planet gear meshed with said sun gear and ring gear such that said planet carrier is driven at a reduced speed ratio relative to said input member;

a range sleeve supported for rotation with said output member and movable thereon between a first position uncoupled from said input member, a second position coupled to said input member for driving said output member at a direct speed ratio relative to said input member, and a third position coupled to said planet carrier for driving said output member at said reduced speed ratio; and a clutch apparatus operably installed between said input member and said output member, said clutch apparatus being actuated in response to movement of said range sleeve toward either of its second and third positions for stopping relative rotation between said input member and said output member prior to coupling of said range sleeve to either of said input member and said planet carrier, said clutch apparatus including a first clutch plate fixed for rotation with said input member, a second clutch plate fixed for rotation with said output member, and a thrust mechanism for actuating said clutch apparatus by frictionally clamping said first and second clutch plates in response to movement of said range sleeve toward its second and third positions.

4. The gear reduction unit of claim 3 wherein said thrust mechanism includes an intermediate sleeve supported for rotation with and sliding movement on said output member, and wherein said range sleeve is supported for rotation with and sliding movement on said intermediate sleeve, said thrust mechanism further including a detent assembly for releasably coupling said intermediate sleeve for sliding movement with said range sleeve, said detent assembly operable for releasing said range sleeve for sliding movement relative to said intermediate sleeve following actuation of said clutch apparatus.

5. A transfer case for selectively delivering drive torque from the engine to front and rear drivelines of a four-wheel drive vehicle, comprising:

a housing;

an input shaft supported in said housing and driven by the engine;

an output shaft supported in said housing and operably coupled to one of the front and rear drivelines;

a planetary gear assembly driven at a reduced speed ratio relative to said input member;

a range sleeve supported for rotation with said output shaft and movable thereon between a first position uncoupled from said input shaft, a second position coupled to said input shaft for driving said output shaft at a direct speed ratio relative to said input shaft, and a third position coupled to said planetary gear assembly for driving said output shaft at said reduced speed ratio; and a clutch apparatus operably installed between said input shaft and said output shaft, said clutch apparatus being actuated in response to movement of said range sleeve toward either of its second and third positions for stopping relative rotation between said input shaft and said output shaft prior to coupling of said range sleeve to either of said input shaft and said planetary gear assembly, said clutch apparatus including a set of first clutch plates fixed for rotation with said input shaft, a set of second clutch plates fixed for rotation with said output shaft and which are alternately interleaved with said first clutch plates, and a thrust mechanism for actuating said clutch apparatus by frictionally clamping said first and second clutch plates in response to movement of said range sleeve toward its second and third positions.

6. The transfer case of claim 5 wherein said thrust mechanism includes an intermediate sleeve supported for rotation with and sliding movement on said output shaft, and wherein said range sleeve is supported for rotation with and sliding movement on said intermediate sleeve, said thrust mechanism further including a detent assembly for releasably coupling said intermediate sleeve for movement with said range sleeve, said detent assembly operable for releasing said range sleeve for sliding movement relative to said intermediate sleeve following actuation of said clutch apparatus.

7. The transfer case of claim 5 wherein said planetary gear assembly includes a sun gear fixed to said input shaft, a ring gear fixed to said housing, and a planet carrier rotatably supporting a planet gear meshed with said sun gear and ring gear such that said planet carrier is driven at said reduced speed ratio relative to said input shaft, and wherein movement of said range sleeve to said third position causes said range sleeve to be coupled to said planetary carrier.

8. A gear reduction unit comprising:
    an input member;
    an output member;
    a planetary gear assembly driven by said input member at a reduced speed ratio relative thereto;
    an intermediate sleeve supported for rotation with and sliding movement on said output member;
    a range sleeve supported for rotation with said intermediate sleeve and movable thereon between a first position uncoupled from said input member, a second position coupled to said input member for driving said output member at a direct speed ratio relative to said input member, and a third position coupled to said planetary gear assembly for driving said output member at said reduced speed ratio;
    coupling means for releasably coupling said range sleeve to said intermediate sleeve; and
    a clutch apparatus operably installed between said input member and said output member, said clutch apparatus being actuated by said intermediate sleeve in response to movement of said range sleeve toward either of its second and third positions for stopping relative rotation between said input member and said output member prior to coupling of said range sleeve to either of said input member and said planetary gear assembly, said clutch apparatus including a set of first clutch plates fixed for rotation with said input member, a set of second clutch plates fixed for rotation with said intermediate sleeve and which are alternately interleaved with said first clutch plates, and wherein said intermediate sleeve actuates said clutch apparatus by frictionally clamping said first and second clutch plates in response to movement of said range sleeve toward one of its second and third positions.

9. The gear reduction unit of claim 8 wherein said coupling means includes a spring-biased detent assembly for releasably coupling said intermediate sleeve for movement with said range sleeve, said detent assembly being operable for releasing said range sleeve for sliding movement relative to said intermediate sleeve following actuation of said clutch apparatus.

10. A gear reduction unit comprising:
    an input shaft;
    an output shaft;
    a sun gear secured to said input shaft;
    a stationary ring gear;
    a planet carrier rotatably supporting a planet gear meshed with said sun gear and ring gear such that said planet carrier is driven at a reduced speed ratio relative to said input shaft;
    an intermediate sleeve supported for rotation with and sliding movement on said output shaft;
    a range sleeve supported for rotation with said intermediate sleeve and movable thereon between a first position uncoupled from said input shaft, a second position coupled to said input shaft for driving said output shaft at a direct speed ratio relative to said input shaft, and a third position coupled to said planet carrier for driving said output shaft at said reduced speed ratio;
    coupling means for releasably coupling said range sleeve to said intermediate sleeve for movement on said output shaft; and
    a clutch apparatus operably installed between said input member and said output member, said clutch apparatus being actuated by said intermediate sleeve in response to movement of it and said range sleeve toward either of said second and third positions for stopping relative rotation between said input shaft and said output shaft prior to coupling of said range sleeve to either of said input shaft and said planet carrier, said clutch apparatus including a set of first clutch plates fixed for rotation with said input shaft, a set of second clutch plates fixed for rotation with said intermediate sleeve and which are alternately interleaved with said first clutch plates, and wherein movement of said intermediate sleeve actuates said clutch apparatus by frictionally clamping said first and second clutch plates in response to movement of said range sleeve toward one of said second and third positions.

11. The gear reduction unit of claim 10 wherein said coupling means includes a spring-biased detent assembly for releasably coupling said intermediate sleeve for movement with said range sleeve, said detent assembly being operable for releasing said range sleeve for sliding movement relative to said intermediate sleeve following actuation of said clutch apparatus.

* * * * *